US006625286B1

(12) United States Patent
Rubacha et al.

(10) Patent No.: US 6,625,286 B1
(45) Date of Patent: Sep. 23, 2003

(54) PRECISE AMPLITUDE CORRECTION CIRCUIT

(75) Inventors: Raymond Rubacha, Chandler, AZ (US); Kendall G. Moore, Tempe, AZ (US); Samuel L. Thomasson, Gilbert, AZ (US)

(73) Assignee: Acoustic Technologies, Inc., Mesa, AZ (US)

( * ) Notice: Subject to any disclaimer, the term of this patent is extended or adjusted under 35 U.S.C. 154(b) by 0 days.

(21) Appl. No.: 09/336,008

(22) Filed: Jun. 18, 1999

(51) Int. Cl.[7] .......................... H04B 15/00; H04B 3/20

(52) U.S. Cl. .......................... 381/93; 381/83; 381/66

(58) Field of Search .......................... 381/66, 93, 83, 381/317, 318, 321; 379/406.04, 406.05, 406.06, 406.07, 406.15, 406.01; 330/260, 261, 265, 271

(56) References Cited

U.S. PATENT DOCUMENTS 4,131,760 A * 12/1978 Christensen et al. .......... 381/83
5,412,734 A * 5/1995 Thomasson .................. 381/83
5,455,543 A 10/1995 Kechkaylo .................. 332/103
5,455,544 A 10/1995 Kechkaylo .................. 332/103
5,644,641 A * 7/1997 Ikeda ........................ 381/94.1
5,649,019 A 7/1997 Thomasson .................. 381/83
5,680,467 A * 10/1997 Hansen ....................... 381/318
6,278,785 B1 * 8/2001 Thomasson .................. 381/66
6,301,364 B1 * 10/2001 Lowmiller et al. ........... 381/66

* cited by examiner

*Primary Examiner*—Xu Mei
(74) *Attorney, Agent, or Firm*—Paul F. Wille

(57) ABSTRACT

Amplitude is corrected by subtracting a component signal from a composite signal to produce a remainder signal, correlating the remainder signal with the component signal to produce a product signal, averaging the product signal, and adjusting the magnitude of the component signal in accordance with the averaged product signal to minimize the product signal. The amplitude of the component signal is adjusted in a programmable gain amplifier controlled by an up-down counter. The up-down counter is part of a digital control loop including a pseudo-multiplier for multiplying the remainder signal with the component signal. The output of the multiplier controls the direction of the count, which is generally continuous except that it cannot roll over or roll under. The remainder signal is the received signal with the echo removed.

14 Claims, 4 Drawing Sheets

PRECISE AMPLITUDE CORRECTION CIRCUIT

BACKGROUND OF THE INVENTION

This invention relates to feedback canceling circuits and, in particular, to a circuit for precisely correcting the amplitude of a component signal for removing the component signal from a composite signal.

Hearing aids, public address systems, telephones and other devices are often plagued by feedback. Sometimes the feedback is simply an annoying echo, other times the feedback is sufficient to cause the circuit to squeal or oscillate, often loudly. As described in U.S. Pat. No. 5,649,019 (Thomasson), the disclosure of which is incorporated by reference, a difficulty with detecting an echo is determining whether or not a signal is an echo and another difficulty is determining the travel time of the echo.

As described in the Thomasson patent, these difficulties are overcome by tagging original sound with an inaudible replica of the sound and detecting the tag in the returned signal. The system for doing this includes two channels, one of which corrects for phase and amplitude shifts between the channels. One channel recovers the original signal from the tag while the other channel removes the tag from the returned or composite signal. The recovered signal, or component, is subtracted from the composite signal to eliminate echo in the composite signal. In order to cancel an echo, the amplitudes and phases of the signals must be matched and the Thomasson patent describes circuitry suitable for this purpose.

In some applications, particularly low noise environments, it is desirable to match amplitudes exactly to ensure complete cancellation of the echo and the circuits of the prior art are not sufficiently precise for this purpose.

For many applications, it is desired to have the electronics as small as possible, e.g. in telephones or communication equipment in general. If size were no object then it would be relatively easy to provide suitable filters, multipliers, and so on for matching phase and amplitude. It is preferred to integrate the electronics as much as possible, which does not mean that the problem is solved. Rather, the problem is moved from the telephone to the wafer, where as small a die size as possible is desired for reduced costs.

In view of the foregoing, it is therefore an object of the invention to provide an improved echo canceling circuit.

Another object of the invention is to provide a circuit for exactly matching the amplitudes of two signals.

A further object of the invention is to provide a low noise circuit for removing a component from a composite signal.

Another object of the invention is to provide a circuit amenable to integration in relatively small size on a semiconductor die.

SUMMARY OF THE INVENTION

The foregoing objects are achieved in this invention by subtracting the component signal from the composite signal to produce a remainder signal, correlating the remainder signal with the component signal to produce a product signal, averaging the product signal, and adjusting the magnitude of the component signal in accordance with the averaged product signal to minimize the product signal. The amplitude of the component signal is adjusted in a programmable gain amplifier controlled by an up-down counter. The up-down counter is part of a digital control loop including a pseudo-multiplier for multiplying the remainder signal with the component signal. The output of the multiplier controls the direction of the count, which is generally continuous except that it cannot roll over or roll under. The remainder signal is the received signal with the echo removed.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
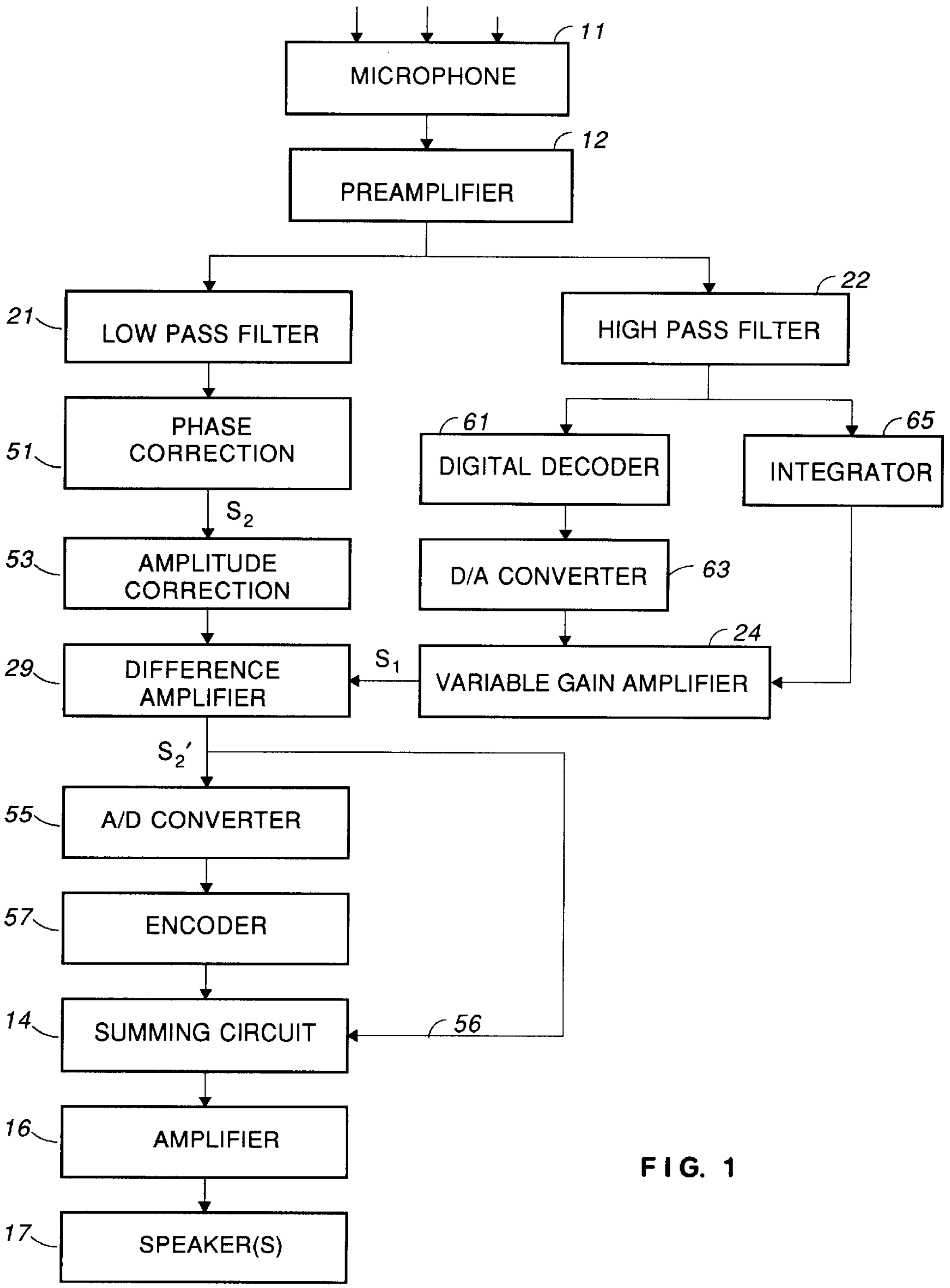
FIG. 1 is a block diagram of echo canceling apparatus.

FIG. 1 illustrates echo canceling apparatus in which the left-hand channel processes an audible signal and the right-hand channel processes an inaudible tag from an echo, if there is an echo. In a preferred embodiment of the invention, the tag is a pulse width modulated signal, although other forms of modulation can be used instead, e.g. frequency modulation (FM).

The sound that strikes microphone 11 is a composite sound having at least three components. A first component is an original sound, a second component is an audible echo of the original sound, and a third component is an inaudible acoustic tag for reducing the echo. The sounds striking microphone 11 are converted into a composite electrical signal and coupled to preamplifier 12. Preamplifier is coupled to low pass filter 21 and high pass filter 22. Low pass filter 21 removes the inaudible portion of the sound and the low frequency portion of the sound is coupled to phase correction circuit 51. Microphone 11 does not have a flat frequency response, nor do speakers 17 or other portions of FIG. 1. Circuit 51 corrects for phase shift by delaying the signal a frequency dependent, variable amount of time.

The output signal from circuit 51 is coupled to amplitude correction circuit 53. Circuit 53 matches the amplitude of the recovered echo with the amplitude of the received echo for removing the echo in difference amplifier 29. The recovered echo is represented in FIG. 1 as $S_1$ and the received signal is represented in FIG. 1 as $S_2$.

High pass filter 22 removes the low frequency or audible portion of the signal from preamplifier 12 and couples the remainder to digital decoder 61. Digital decoder 61 converts the incoming signal into a digital value having a predetermined number of bits that are applied to digital to analog (D/A) converter 63. Decoder 61 and converter 63 are a pulse width demodulator for recovering the original signal from the inaudible modulation. The analog signal from converter 63 is coupled to one input of variable gain amplifier 24. The output from high pass filter 22 is. also coupled to integrator 65, which produces an output signal having a magnitude proportional to the average signal strength of the inaudible component of the sound detected by microphone 11. The output of integrator 65 is coupled to the gain control input of amplifier 24.

The output from variable gain amplifier 24 is a component signal, $S_1$, representing the original sound, now an echo. The signal is coupled to one input of difference amplifier 29. The other input to difference amplifier 29 is connected to amplitude correction circuit 53. Difference amplifier 29 subtracts the component sound from the audible portion of the sound detected by microphone 11, thereby reducing or eliminating any echo.

The output signal, $S_2'$, from difference amplifier 29 corresponds essentially only to the original sound arriving at microphone 11. This signal is now tagged with an inaudible replica of itself. Specifically, the signal is coupled to A/D converter 55, which converts the signal to a series of digital pulses representative of the signal. For example, converter 55 includes circuit, known per se in the art, for sampling the incoming signal and providing digital data representative of the amplitude of each sample. A typical sampling rate twenty kilohertz.

The data from converter 55 is coupled to encoder 57, which converts the data into an inaudible, pulse width modulated signal. Thus, converter 55 and encoder 57 are a pulse width modulator producing a signal having a fundamental frequency greater than about 20 kHz. This signal is combined in summing circuit 14 with a signal from amplifier 29 and broadcast by way of amplifier 16 and speakers 17.

Figure 2:
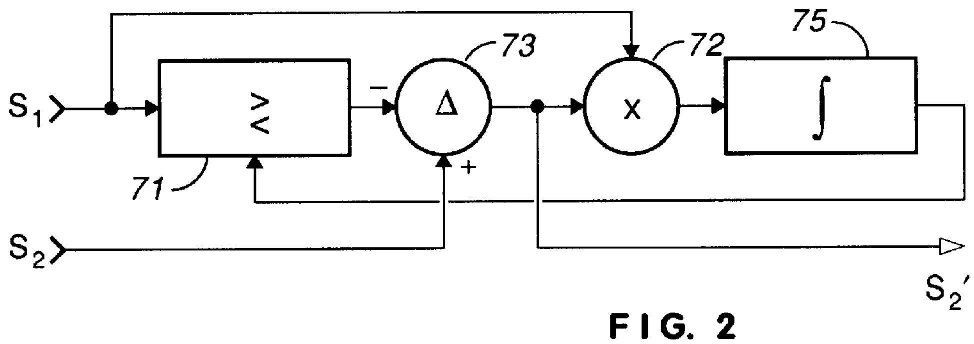
FIG. 2 is a functional diagram of apparatus constructed in accordance with the invention for matching the amplitude of two signals.

FIG. 2 is a functional diagram of blocks 53 and 29 in FIG. 1. The component signal, $S_1$, is coupled to variable gain amplifier 71 and to one input of multiplier or correlator 72. The output of programmable gain amplifier 71 is coupled to the negative input of difference amplifier 73. The low pass filtered composite signal, $S_2$, is applied to the positive input of difference amplifier 73. The output from difference amplifier 73 is coupled to a second input of multiplier 72. The output from multiplier 72 is coupled to low pass filter or integrator 75. The output from integrator 75 is coupled to the control input of variable gain amplifier 71.

In operation, $S_1$ is the original sound as reconstructed from the tag. It represents a "pure" echo, undistorted by transmission. $S_2$ contains new sound, possibly including the echo of an earlier sound. In difference amplifier 73, the echo component is subtracted from the composite sound. If the echo is not completely canceled, then the two signals into multiplier 72 correlate, producing an error signal. In other words, one is using the component echo to look for an echo in the composite sound. If an echo is found, the system is adjusted until the echo is eliminated. In one embodiment of the invention, the process was completed in only a few milliseconds.

The error signal is averaged by integrator 75 and applied to the control input of variable gain amplifier 71, which adjusts the gain to minimize the output from multiplier 72. If the echo is completely canceled, then the output of multiplier 72 is a minimum and the gain in amplifier 71 is not further adjusted. The output from the circuit is taken from difference amplifier 73, which is now the composite signal without an echo, $S_2'$.

Figure 3:
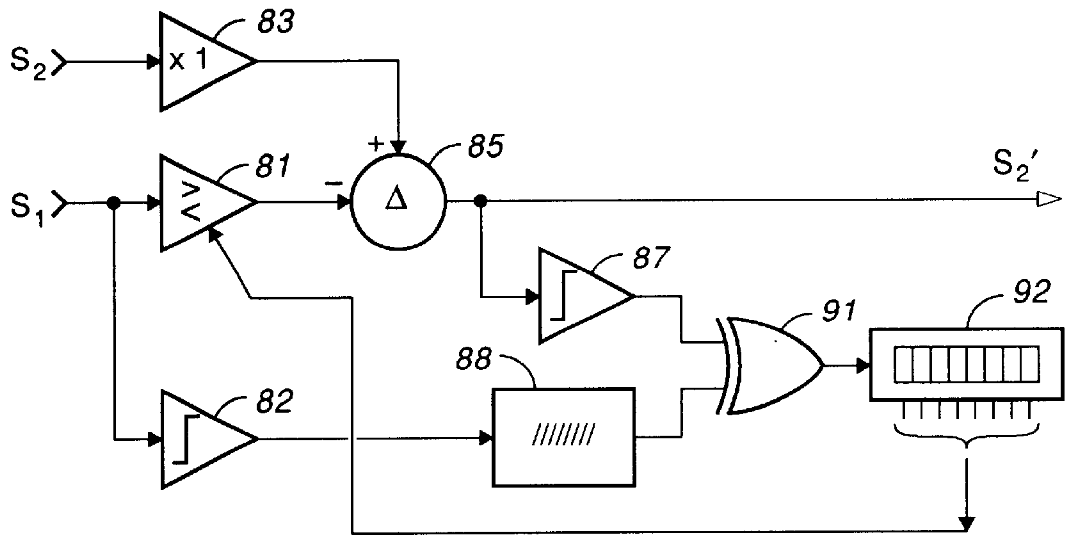
FIG. 3 is a schematic diagram of a circuit constructed in accordance with the invention.

FIG. 3 is a block diagram of an embodiment of the invention in which the control loop is digital and the signals being processed are analog. The circuit illustrated in FIG. 3 works in the same manner as FIG. 2 for removing $S_1$ from $S_2$. The component signal, $S_1$, is applied to programmable gain amplifier 81 and to comparator 82. The composite signal, $S_2$, is applied to buffer amplifier 83, which preferably has unity gain.

The signal from-programmable gain amplifier 81 and the signal from buffer amplifier 83 are subtracted in difference circuit 85. The output of difference circuit 85 is coupled to comparator 87. Comparators 82 and 87 are substantially identical circuits and compare the input signal to zero volts; i.e. the output of the comparator is high when the input signal is positive and the output is zero when the input signal is negative. The outputs of the comparators are coupled to exclusive-OR circuit 91, which controls up-down counter 92. The output of comparator 82 is coupled through delay line 88 to match the delays in amplifier 81 and difference circuit 85.

Exclusive-OR circuit 91 controls the direction of counting in up-down counter 92, which counts continuously (i.e. once per clock cycle) but does not reset or roll over. That is, if the count decreases to zero, counting ceases until a signal is received from exclusive-OR circuit 91 to count up. Similarly, if the count is at maximum, counting ceases until a signal is received from exclusive-OR circuit 91 to count down. Not rolling over prevents erratic operation of the control loop when the input signals are very low in amplitude, for example.

Up-down counter 92 can be as many bits wide as desired, depending upon how finely one wants to adjust amplitude. Too many bits may slow the system excessively. In one embodiment of the invention, an eight bit up-down counter was used.

Comparing FIG. 3 with FIG. 2, the comparators and exclusive-or circuit act as a multiplier or correlator and the up-down counter acts as an integrator. The implementation of FIG. 3 is much simpler, and much faster, than using an actual analog multiplier or a digital signal processing chip, and is just as accurate. The functions described in connection with FIG. 2 are obtained from the circuit shown in FIG. 3.

Figure 4:
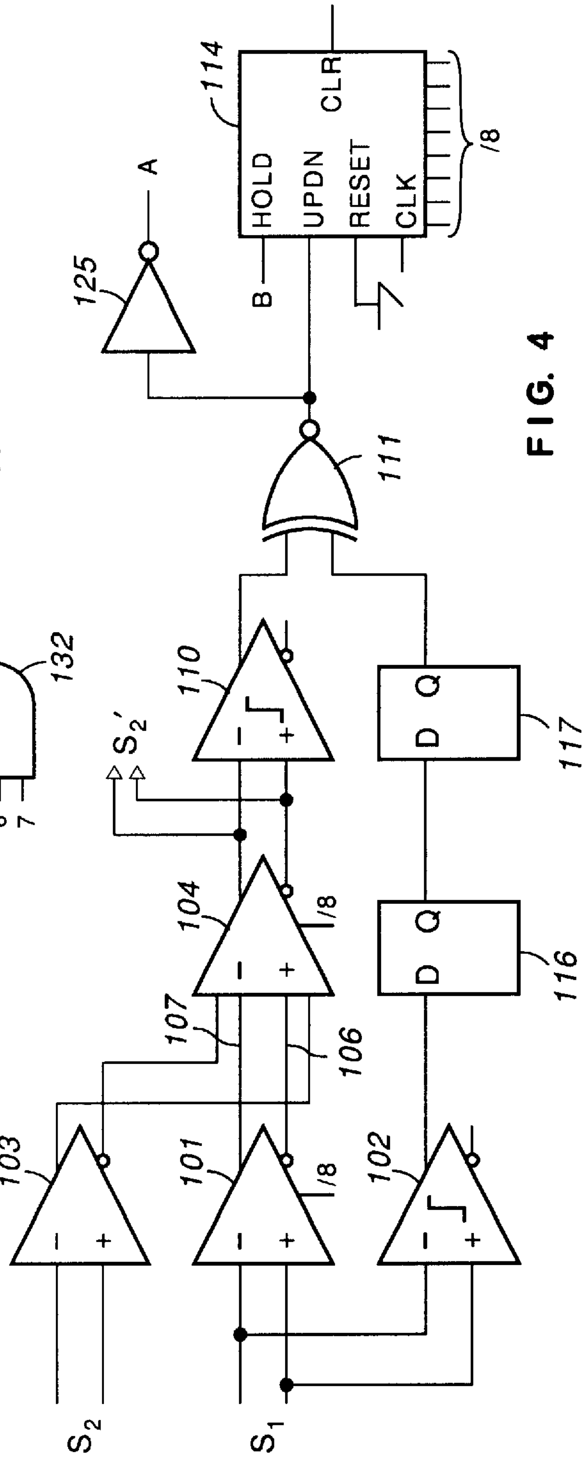
FIG. 4 is a schematic of one embodiment of the invention.

FIG. 4 is a schematic of an actual embodiment of the invention, and is a further simplification of the circuit. For reasons unrelated to this invention, differential signals are used. The signals on each line are equal in magnitude and opposite in sign.

The component signal, $S_1$, is applied to programmable gain amplifier 101 and to comparator 102. The composite signal, $S_2$, is applied to buffer amplifier 103, which preferably has unity gain. Unlike the embodiment of FIG. 3, two programmable gain amplifiers, 101 and 104, are used. It is much simpler to cover a range of $1/16$–1.4 than to cover a range of $1/256$–2. Thus, two programmable gain amplifiers are used in cascade.

The output from buffer amplifier 103 is coupled to the inputs of the second programmable amplifier but with the leads reversed. This provides a subtraction function. Specifically, the negative output from amplifier 103 is coupled to the positive input of amplifier 104 by lead 106. The positive output from amplifier 103 is coupled to the negative input of amplifier 104 by lead 107. The output from amplifier 104 is the output of the circuit and is coupled to comparator 110.

Comparators 102 and 110 are substantially identical circuits and compare the input signal to zero volts; i.e. the output of the comparator is high when the input signal is positive and the output is zero when the input signal is negative. The outputs of the comparators are coupled to exclusive-or circuit 111, which controls up-down counter 114. The output of comparator 102 is coupled through flip-flops 116 and 117 to match the delays in amplifiers 103 and 104.

Figure 5:
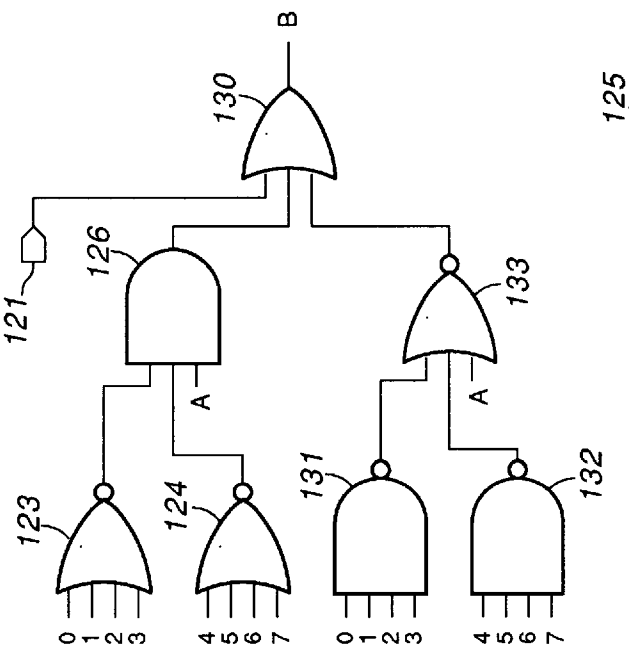
FIG. 5 is a schematic of ancillary logic for controlling an up-down counter.

Exclusive-OR circuit 111 is coupled to the direction input of up-down counter 114, which counts continuously (i.e. once per clock cycle) but does not reset or roll over because of the logic illustrated in FIG. 5. The output of counter 114 is coupled to amplifiers 101 and 104. It has been found preferable to control the cascaded programmable amplifiers simultaneously, rather than having one provide a coarse correction and the other provide a fine correction. Although some steps in the range of possible gains are lost, the circuit responds quickly and has adequate resolution.

FIG. 5 is a schematic of a simple logic circuit for preventing rollover. The bits are examined for 00000000 or 11111111 and, if either condition exists, the hold input of counter 114 (FIG. 4) is activated to prevent further counting. Specifically, a logic one on any input to OR gate 120 causes a hold. Input 121 is a system hold. If all data lines are zero, the outputs of NOR gates 123 and 124 are high. If the output of inverter 125 (FIG. 4) is also high (indicating a down count), then the output of AND gate 126 is high, causing a hold. If all data lines are high (logic one), then the outputs of NAND gates 131 and 132 are low. If the output of inverter 125 is also low (indicating an up count), then the output of NOR gate 133 is high, causing a hold.

Figure 7:
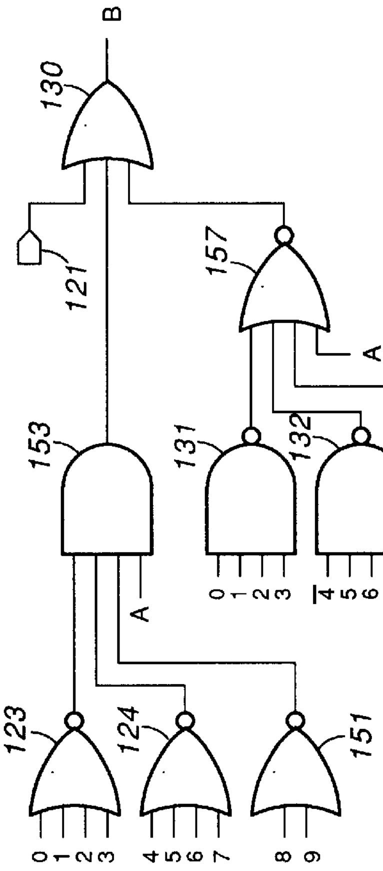
FIG. 7 is a schematic of ancillary logic for controlling an up-down counter.
Figure 6:
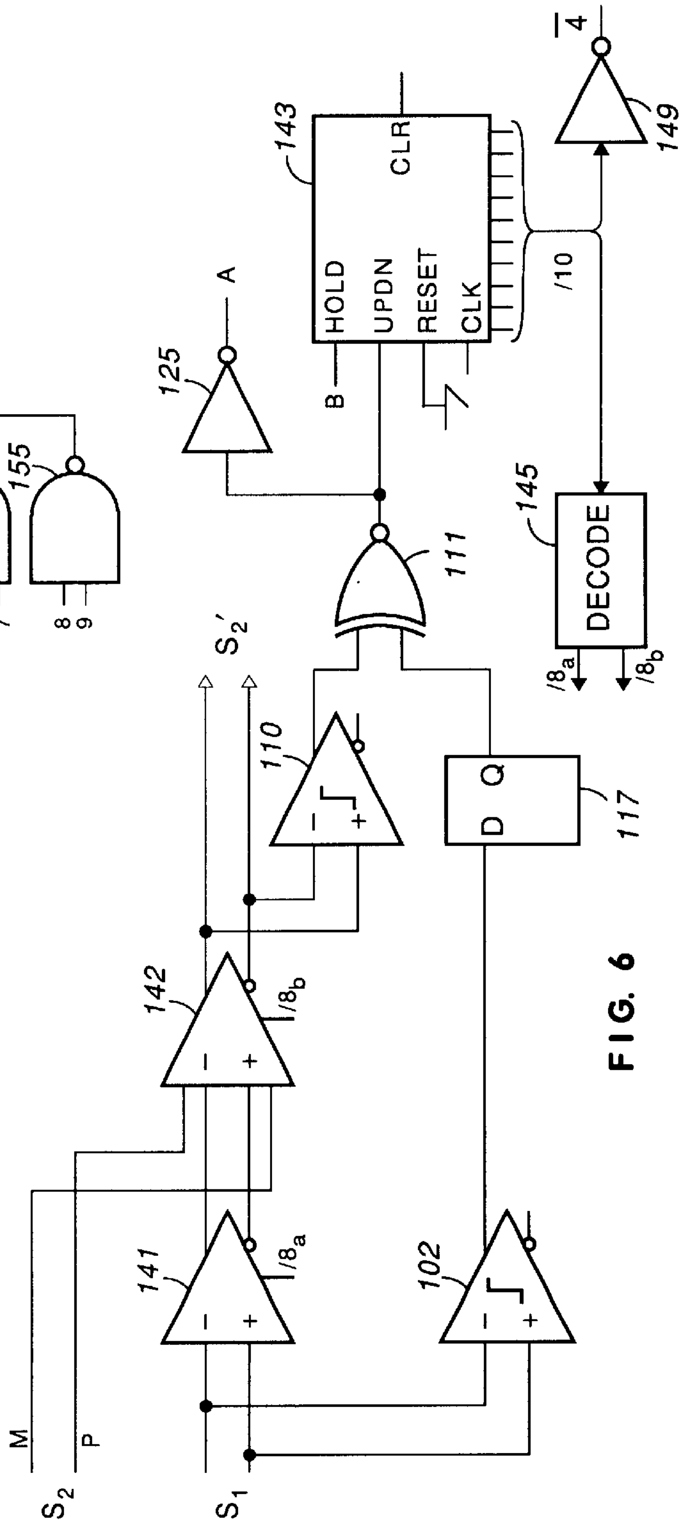
FIG. 6 is a schematic of an alternative embodiment of the invention.

Although the circuit illustrated in FIGS. 4 and 5 has good resolution and speed and has relatively few components, the circuit illustrated in FIGS. 6 and 7 is twice as fast, has four times the resolution, and can be implemented on a smaller die than the circuit of FIGS. 4 and 5. The circuit of FIGS. 6 and 7 retains the characteristic of analog signal with digital control as in previously described embodiments.

In FIG. 6, the component signal, $S_1$, is applied to programmable gain amplifier 141 and to comparator 102. The composite signal, S2, is applied directly to programmable gain amplifier 142 from a source follower (not shown). The "M" or minus lead is coupled to the non-inverting input of amplifier 142 and the "P" or positive lead is applied to the inverting input of amplifier 142, producing the subtraction described above.

Amplifiers 141 and 142 are not the same. Specifically, programmable amplifier 141 operates continuously whereas programmable amplifier 142 samples the incoming signal at a high rate, e.g. approximately 150 kHz. This combination has been found to provide the best result with fewer timing errors than with other arrangements.

Each amplifier has an eight bit input but the amplifiers do not receive the same eight bits of information. Counter 143 is a ten bit counter and the output from the counter is applied to decoder 143 where the data is re-arranged into two eight bit bytes. Ten bits of information theoretically provides $2^{10}$ (1,024) states or permutations. In the particular circuit illustrated in FIG. 6, there are only $2^8$ (256) distinct possible states. For example, amplifier 141 with a gain of two and amplifier 142 with a gain of one is the same overall gain as amplifier 141 with a gain of one and amplifier 142 with a gain of two. Decoder 145 eliminates these duplicates.

Decoder 145 provides a second function in that the changes in state of amplifiers 141 and 142 must be monotonic, i.e. steadily increasing or decreasing. Because of the logic, each change in gain may not be the same size step as every other change but a change in state cannot result in a decrease in gain when an increase is intended or vice-versa. As described in connection with FIG. 4, the programmable amplifiers are not operated as coarse and fine. Rather, the changes are interleaved under the control of counter 143 and decoder 145 to produce more and smaller steps than in the circuit of FIG. 4; specifically, four times the number of steps.

The output from comparator 102 is coupled to exclusive NOR circuit 111 through delay 117. That is, one delay circuit has been eliminated because the buffer amplifier, and its delay, has been omitted for composite signal $S_2$, thereby improving the speed of the circuit. The speed of the circuit is also improved by the use of a continuously running, programmable amplifier as the first amplifier for component signal $S_1$. The settling time of amplifier 142 is compensated by delay 117.

Except for the number of bits, the circuit illustrated in FIG. 6 operates in the same manner as the circuit illustrated in FIG. 4. Inverter 149 is added to invert bit four for the logic illustrated in FIG. 7.

In FIG. 7, additional logic is provided to accommodate the additional two bits. NOR circuit 151 is added for bits eight and nine and the outputs of NOR circuits 123, 124, and 151 and HOLD input A are coupled to AND circuit 153. The output of AND circuit 153 is coupled to one input of OR circuit 130. NAND circuit 155 receives bits eight and nine. Bit four is inverted going into NAND gate 132 to accommodate the bit pattern as decoded in decoder 145. The outputs of NAND gates 131, 132, and 155 and HOLD input A are coupled to the inputs of NOR circuit 157. The output of NOR circuit 157 is coupled to the third input of OR gate 130. The circuit operates as described above in connection with FIG. 5 to prevent roll over and roll under.

Figure 8:
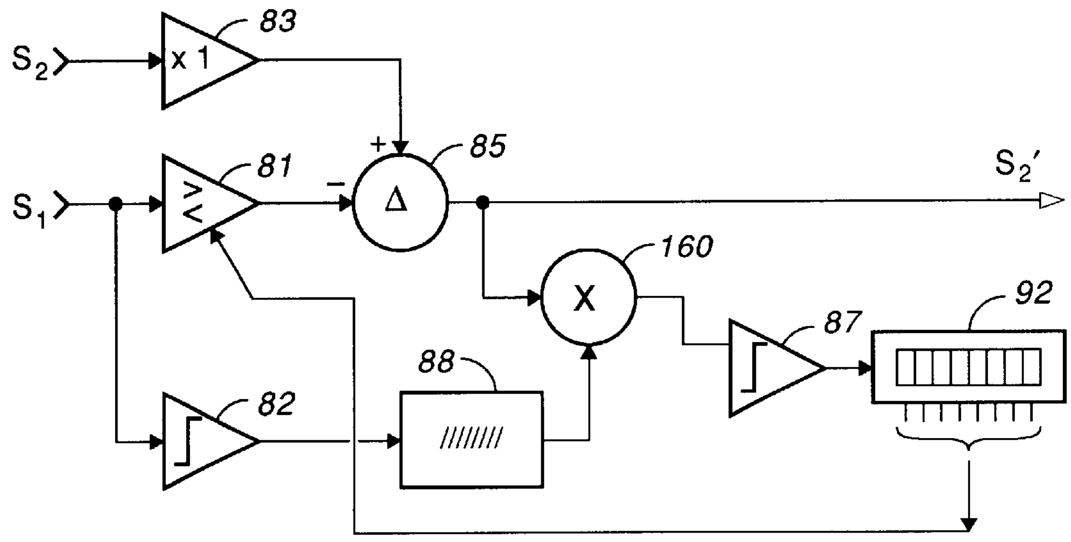
FIG. 8 is a schematic of another alternative embodiment of the invention.

FIG. 8 is a block diagram of an alternative embodiment of the invention using a different type of pseudo-multiplier from FIG. 3. Components in common with FIG. 3 have the same reference number. In FIG. 3, comparators 82 and 87 and exclusive-OR gate 91 provided a pseudo-multiplication function. That function is provided in FIG. 8 by multiplier 160. A ring modulator is known in the art as a multiplier circuit. Recent examples of such circuits are described in U.S. Pat. Nos. 5,455,543 and 5,455,544. In FIG. 8, multiplier 160 operates by reversing the phase of the analog signal ($S_2'$) in accordance with a digital signal from comparator 82. The digital signal in this case is derived from the component signal and is relatively noise free. Thus, the phase reversal will be relatively error free and noise in $S_2'$ will average to zero rapidly.

The invention thus provides an improved echo canceling circuit for exactly matching the amplitudes of two signals and for removing a component signal from a composite signal. The circuit is essentially analog and provides a relatively simple way to perform a sophisticated function. The circuitry is easily implemented in integrated circuit form and, when so implemented, requires a relatively small die.

Having thus described the invention, it will be apparent to those of skill in the art that various modifications can be made within the scope of the invention. For example, in FIG. 3, one could delay the composite signal prior to comparator but this would require an analog delay line. A digital delay line following the comparator is simpler to implement. One could use nine bits in the circuit of FIG. 6 and have the least significant bit select either amplifier 141 or amplifier 142 for the next byte of data, thereby simplifying the decoding logic.

What is claimed as the invention is:

1. A method for removing a component signal from a composite signal, said method comprising the steps of:

subtracting the component from the composite signal to produce a remainder signal;

correlating the remainder signal with the component signal to produce a product signal; and adjusting the magnitude of the component signal until the product signal is at a minimum.

2. The method as set forth in claim 1 and further including the step of averaging the product signal.

3. The method as set forth in claim 1 wherein said adjusting step includes the steps of:

averaging the product signal;

adjusting the magnitude of the component signal in accordance with the averaged product signal.

4. A method for reducing echoes, said method comprising the steps of:

projecting a composite signal including audible and inaudible components;

sensing the composite signal and separating the composite signal into audible and inaudible signals;

converting the inaudible signal into an audible component;

subtracting the audible component from the audible signal to produce a remainder signal;

correlating the remainder signal with the audible component to produce a product signal; and adjusting the magnitude of the audible component signal until the product signal is at a minimum.

5. The method as set forth in claim 4 and further including the step of averaging the product signal.

6. The method as set forth in claim 4 wherein said adjusting step includes the steps of:

averaging the product signal;

adjusting the magnitude of the audible component signal in accordance with the averaged product signal.

7. Apparatus for removing a component signal from a composite signal, said apparatus comprising:

a variable gain amplifier having an input for receiving said component signal, a control input for adjusting gain, and an output; a a difference circuit having a first input coupled to the output of said variable gain amplifier, having a second input for receiving said composite signal, and having an output;

a correlator having a first input coupled to the input of said variable gain amplifier, a second input coupled to the output of said difference circuit, and an output;

an integrator coupled to the output of said correlator and to said control input for adjusting the gain of said variable gain amplifier.

8. The apparatus as set forth in claim 7 wherein said correlator includes a ring modulator.

9. The apparatus as set forth in claim 7 wherein said correlator includes:

a first comparator having an input coupled to said difference circuit and an output;

a second comparator having an input coupled to the input of said variable gain amplifier and an output;

an exclusive-OR circuit having a first coupled to the output of said first comparator, a second input coupled to the output of said second comparator, and an output.

10. The apparatus as set forth in claim 9 wherein said integrator includes an up-down counter controlled by said exclusive-OR circuit.

11. The apparatus as set forth in claim 10 and further including logic circuitry from preventing said up-down counter from rolling over or rolling under.

12. The apparatus as set forth in claim 7 wherein said variable gain amplifier includes a first amplifier and a second amplifier, wherein the output. of the first amplifier is coupled to the input of the second amplifier.

13. The apparatus as set forth in claim 12 wherein said first amplifier has an inverting output and the second amplifier has a non-inverting input, wherein said inverting output is coupled to said non-inverting input.

14. The apparatus as set forth in claim 12 wherein said first amplifier has a non-inverting output and the second amplifier has an inverting input, wherein said non-inverting output is coupled to said inverting input.

* * * * *